United States Patent [19]

Moyer

[11] Patent Number: 4,497,242

[45] Date of Patent: Feb. 5, 1985

[54] VENTILATION CONTROL SYSTEM

[75] Inventor: Robert C. Moyer, Rochester, N.Y.

[73] Assignee: Barber-Colman Company, Rockford, Ill.

[21] Appl. No.: 347,752

[22] Filed: Feb. 11, 1982

[51] Int. Cl.³ .............................................. F23J 11/00
[52] U.S. Cl. ..................................... 98/115.3; 98/34.5
[58] Field of Search ................. 98/33 R, 33 A, 115 R,
98/115 LH, 115 SB; 126/299 R, 299 D;
417/22, 42

[56] References Cited

U.S. PATENT DOCUMENTS

| | | | |
|---|---|---|---|
| 1,552,316 | 9/1925 | Krieg | 98/115 R |
| 1,630,317 | 5/1927 | Skonier . | |
| 1,676,969 | 7/1928 | Sutton et al. | 98/115 R |
| 2,043,561 | 6/1936 | Sims | 98/39 |
| 2,817,283 | 12/1957 | Caldwell | 98/33 |
| 3,130,908 | 4/1964 | Henne | 236/49 |
| 3,352,225 | 11/1967 | Ffiske | 98/33 |
| 3,572,959 | 3/1971 | Shaughnessy | 417/22 X |
| 3,766,906 | 10/1973 | Jenn | 126/299 D |
| 3,800,689 | 4/1974 | Brown | 126/299 D |
| 3,982,583 | 9/1976 | Shavit | 165/16 |
| 4,050,368 | 9/1977 | Eakes | 98/115 LH |
| 4,058,299 | 11/1977 | Lindkvist | 266/48 |
| 4,160,407 | 7/1979 | Duym | 98/115 R |
| 4,189,094 | 2/1980 | Robinson | 236/46 R |
| 4,221,543 | 9/1980 | Cosentino et al. | 417/22 |
| 4,241,871 | 12/1980 | Newell et al. | 236/49 |
| 4,261,256 | 4/1981 | Joret | 98/115 SB |
| 4,284,236 | 8/1981 | Bradshaw | 98/115 R |
| 4,326,837 | 4/1982 | Gilson et al. | 417/22 X |
| 4,347,712 | 9/1982 | Benton et al. | 236/49 X |

FOREIGN PATENT DOCUMENTS 1208863  1/1966  Fed. Rep. of Germany .... 98/115 R

Primary Examiner—Harold Joyce
Attorney, Agent, or Firm—Martin LuKacher

[57] ABSTRACT

The unnecessary removal of heated or cooled room air by fume hoods is prevented during off-peak periods through a manual and automatic fume hood ventilating system. Ventilation (exhaust) air quantities are reduced in response to operator and/or automated programmed control of the exhaust fan shaft speed. The safety integrity of the fume hood system is improved by providing the operator with visual and audible dynamic feedback of the system operating status. Room air balance is maintained through subsequent reset of the room supply air coincident with exhaust air quantity adjustment. Building make-up air balance is possible using individual instantaneous exhaust flow summary signals to control the outside air flow rate.

7 Claims, 4 Drawing Figures

VENTILATION CONTROL SYSTEM

DESCRIPTION

The present invention relates to ventilation control systems and more particularly to ventilating systems wherein air is exhausted through fume hoods.

BACKGROUND OF THE INVENTION

Energy conservation efforts have focused attention on the reduction of ventilation (exhaust) air where possible. The typical chemistry fume hood used in research laboratories of petro-chemical and pharmaceutical corporations as well as university and high school classrooms is an obvious target. Large volumes of air are heated and cooled only to be discharged through the fume hood. Reduction or elimination of exhaust air during unoccupied hours is a key energy conservation objective.

Fume hood exhaust systems are provided to facilitate researchers and technicians conducting work on noxious or toxic substances without degradation of the room environment. Any attempts to conserve energy must not compromise the integrity of the fume hood device or any surrounding associated devices.

In conventional systems, room air is exhausted outside the building through fume hoods by an exhaust fan or fans. These fans typically run continuously resulting in the wasteful discharge of heated or cooled room air during unoccupied periods.

Some building operators have simply turned off exhaust fans when hoods are not in use, resulting in some energy savings, but usually not without some undesirable side effects. First, most fume hoods have significant quantities of chemicals stored within, even when the hood is not in use. The amount, type and manner in which they are kept can present a hazard to the room environment if flow through the fume hood is totally eliminated. In addition, unless airflow status information is provided at the hood, the operator may not be aware of the lack of exhaust flow through the hood.

Stopping only the exhaust fan without making corresponding adjustments to the supply system results in air imbalance within the building. When the room side supply remains constant, pressurization causes crossflow to other room areas and corridors. This is undesirable not only from a draft standpoint, but also in that it fosters contamination and odor problems. Some imbalance conditions can become so extreme that doors are difficult to open or close.

Shutdown of the exhaust fan without coincident reset of the amount of outside air may result in achieving partial savings of the full potential available. The exhaust fan horsepower would be saved in this case, but the larger savings resulting from reduction of temperature and humidity treatment of the make-up air may be lost.

The installation of a damper control in the exhaust duct which could throttle or reduce exhaust flow through the fume hood in response to a manual or automatic signal has been proposed. This approach has the advantage of reducing exhaust flow from each individual fume hood. Weaknesses of this approach include (1) instability of performance of the exhaust fan due to imbalance, (2) chemical degradation of the damper and operator parts exposed to the exhaust air stream, (3) potential exhaust fan horsepower savings are lost, and (4) the pressure balance within the room is upset since exhaust air flow is altered without corresponding supply air adjustments.

It has also been proposed to use means for stabilizing the performance of the exhaust fan while varying the amount of room air being exhausted. It still requires, however, the use of a balance damper in the exhaust air stream subject to corrosive destruction. Further, potential fan horsepower savings continue to be lost and the pressure balance problems within the room have not been overcome.

SUMMARY OF THE INVENTION

According to the present invention, the exhaust air flow can be reduced when desired with (1) stability of the exhaust fan performance, (2) maintained pressure balance in the room between the supply and exhaust flows, (3) savings in fan horsepower realized during periods of reduced exhaust flow, (4) system reliability since there are no moving parts in the exhaust air stream, and (5) complete dynamic audio and visual status indication of the fume exhaust system operating condition at the fume hood. Conversely, the exhaust air flow rate can be increased back to the full design value when the fume hood is required for use.

Further, the invention provides data, in the form of output signals, as to the amount of exhaust flow from each fume hood and exhaust fan combination which serves as the necessary input data for computing the amount of variable make-up air (exhaust replacement air) that must be introduced at each instant and distributed by the building supply air system. The fume hood ventilation control system in accordance with the invention then allows the measurement of exhaust flow as a function of the speed of each exhaust fan.

A system embodying the invention may be implemented with fan speed sensors/controllers with each exhaust fan responsive to manual or automatic programmed control to dynamically balance air flows within each fume hood, each room, and the building.

The foregoing and other advantages, features and objects of this invention will become more apparent from reading of the following detailed description with reference to the accompanying drawings in which.

DETAILED DESCRIPTION

Figure 1:
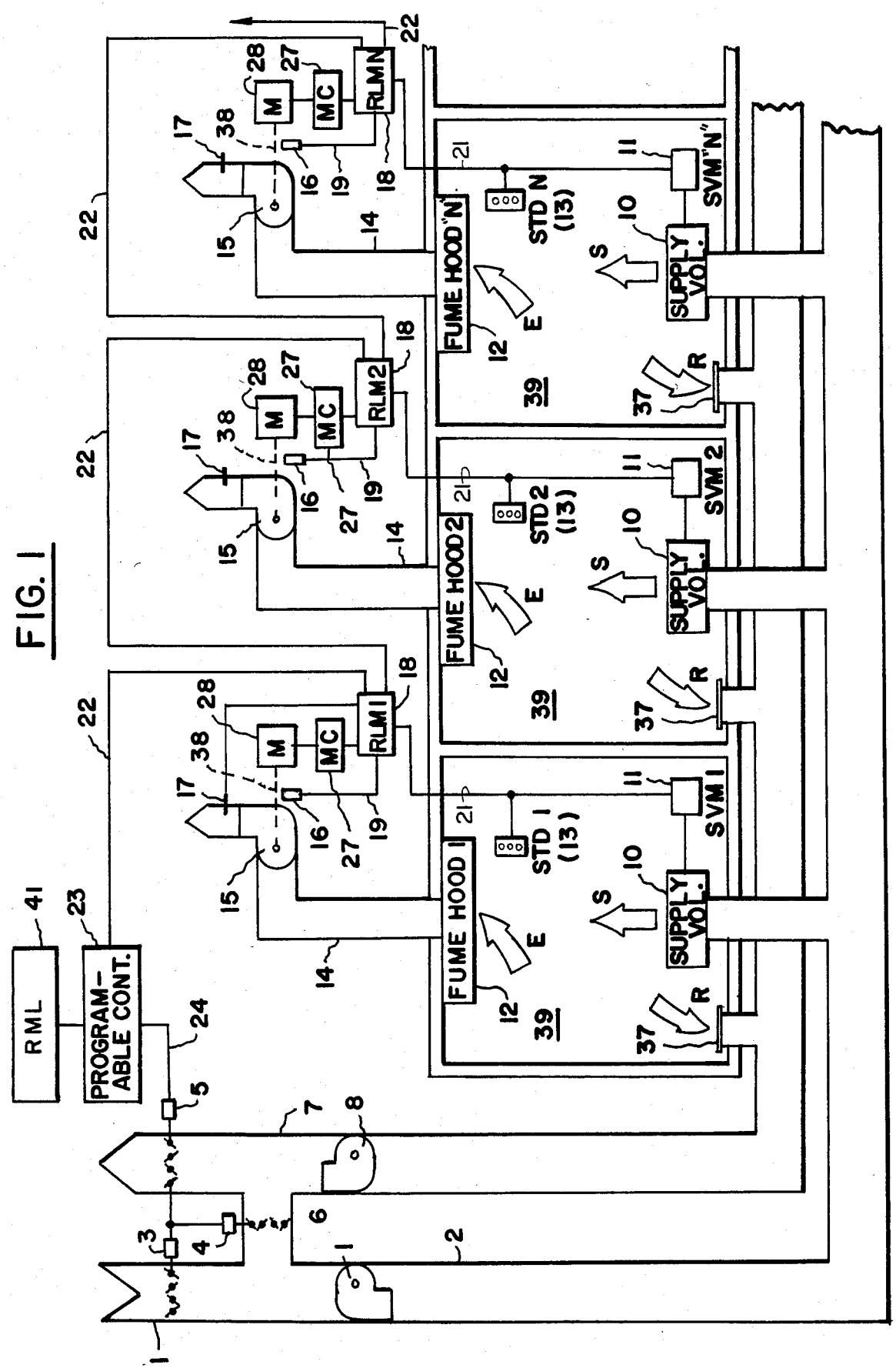
FIG. 1 is a schematic representation of typical supply and exhaust systems within a building and the interface of the control concepts of this invention.

A fume hood ventilation control system in accordance with a preferred embodiment of this invention is shown in the drawings.

In FIG. 1, multiple exhaust fume hoods 12 are shown connected to their respective exhaust fans 15 by ductwork sections 14. The exhaust fans are operated by motors 28. Room air supply 2 is distributed from the supply fan 1, through a supply volume control device 10 (e.g., a motor controlled damper) to the room 39 itself. Room air not exhausted through the fume hood 12 is picked up at the return vent or grille 37 by the return fan 8.

Figure 2:
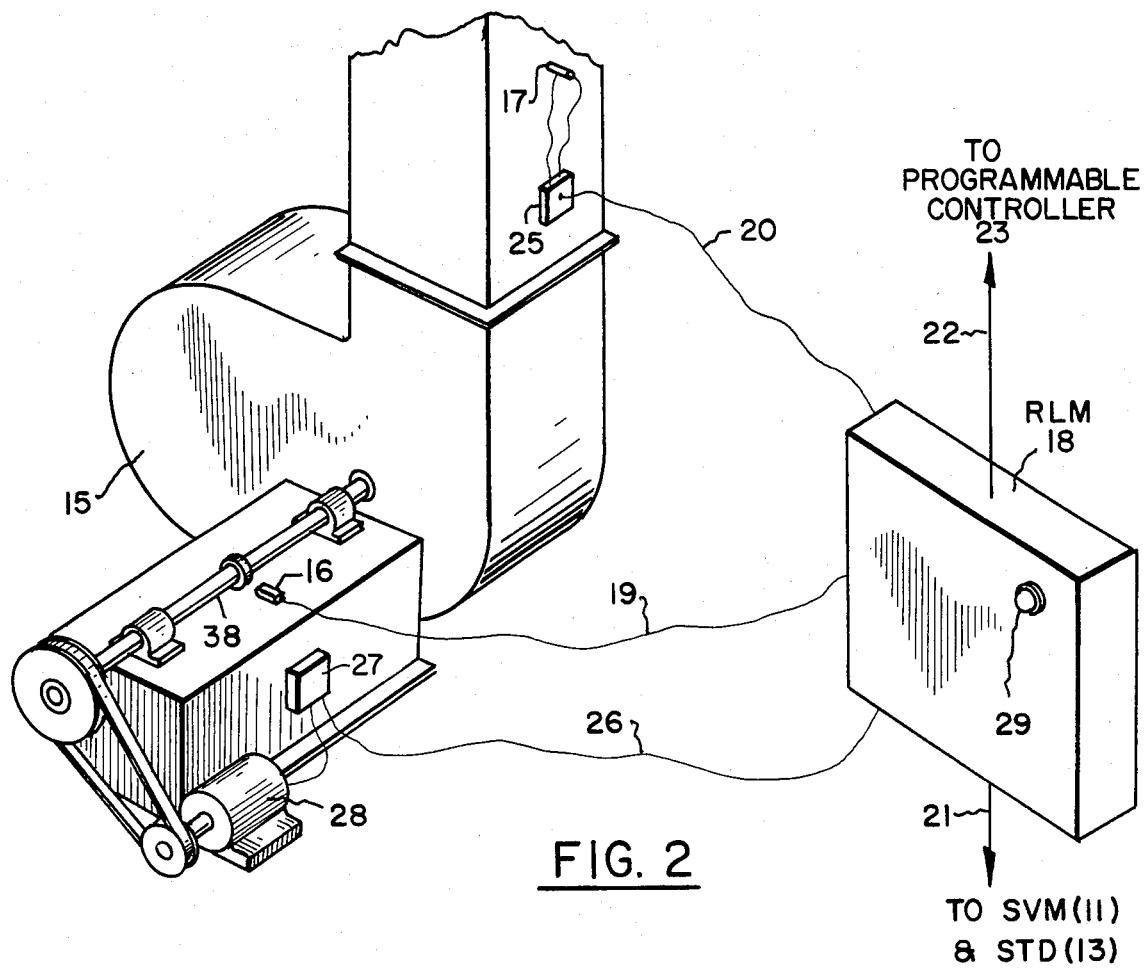
FIG. 2 is a diagrammatic enlarged detail of a typical exhaust fan and the interface of the control components of this invention.
Figure 3:
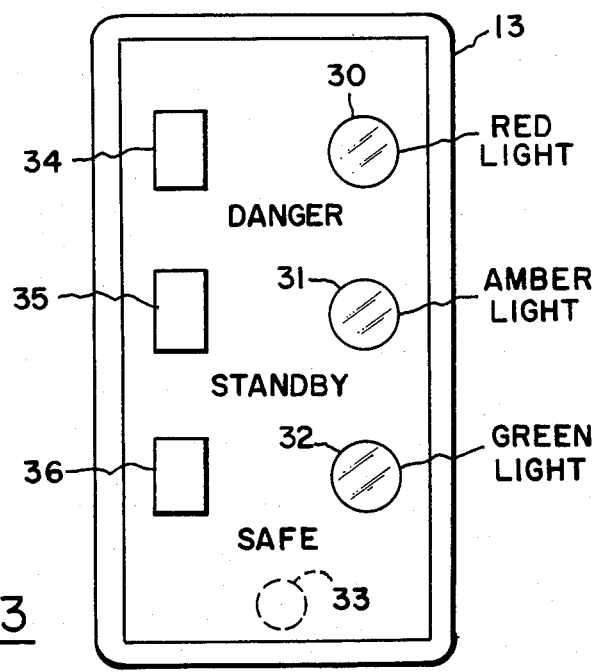
FIG. 3 is a diagrammatic representation of the local status/control device used to operator actuate this system and display the current operating status.

Each room has a local terminal device 13 (e.g., an illuminated, push button control switch as shown in FIG. 3). When "safe" or normal operation is selected, the exhaust motor 28 runs at high speed. Verification of this condition comes from a motion detection device 16 which pulses (provides one or more output electrical pulses) for each revolution of the exhaust fan shaft 38 (see also FIG. 2). These pulses or signals are conveyed through low voltage cable 19 to the remote logic module (RLM) 18 for counting. If the counted revolutions compares favorably with the programmed "safe" speed in the RLM 18, it lights the green light 32 on the terminal device 13, which is interconnected to the RLM 18 by wires in a cable 21. At this full speed condition, the supply volume module (SVM) 11 has no effect on the supply volume control device 10.

The "standby" or half speed condition can be reached either by a manual selection at the local terminal device 13 or on an automatic output from a programmable controller 23. The controller 23 is a computerized device, e.g., a Modicon or Texas Instruments programmable controller. It responds to sensor (temperature and pressure inputs) and operates motorized dampers 3, 4 & 5 in the main supply, mixing and return ducts 1, 6 & 7.

Manual selection of the "standby" flow switch button 35 on the local terminal device 13 results in a speed reduction command from the RLM 18 to the exhaust fan motor controller 27. The motion detection device 16 inputs to the RLM 18 for comparison with the programmed "standby" speed in the RLM 18. A favorable comparison results in lighting the amber light 31 on the local terminal device 13.

Automatic speed reduction may be accomplished through the programmable controller 23, which is connected to devices 13 in each room 39, via the RLM's 18 by cables 22, and produces the same end results as the manual speed reduction described above. However, automated speed reductions from controller 23 also initiates an audible output from a horn 33 located on the local terminal device 13. The operator has the discretion to override the automated speed reduction through the "safe" switch 36 on the local terminal device 13.

The "off" condition is available either by manual selection at the local terminal device 13 or automatically through a preprogrammed command of the programmable controller 23. Manual selection of the "off" switch 34 on the local terminal device 13 results in a stop command from the RLM 18 to the exhaust fan motor controller 27. The motion detection device 16 inputs to the RLM 18, shaft 38 speed condition. If the RLM 18 detects no motion, the red light 30 is lit on the local terminal device 13.

Alarm features are included to inform both the fume hood operator and remote maintenance people of off-normal conditions. Whenever the operating status, as selected at the local terminal device 13 or programmable controller 23, is different from the actual operating conditions as read by the motion detection device 16 and interpreted by the RLM 18, a maintenance alarm is issued by the RLM 18 to the programmable controller 23 for display at the central maintenance location 41 and at the RLM 18 through alarm light 29. If this off-normal operating condition is less safe than the selected operating condition, the audible alarm at the local terminal device 13 is activated. Off-normal conditions safer than the selected operating conditions have no audible alarm.

A velocity pressure sensor 17 provides a redundant no-flow alarm to the local terminal device 13 through the RLM 18.

The local terminal device 13 is shown in greater detail in FIG. 3. It is composed of three status lights, three selection buttons, and an audible alarm. The top light 30 is red signifying "danger", and the top switch 34, also colored red, is the "off" switch. The center light 31 is amber signifying "caution", the center switch 35, also colored amber, is the "standby" or reduced speed (flow) switch. The bottom light 32 is green signifying "safe", and the bottom switch, also colored green, is the "normal" or full speed (flow) switch. The audible alarm 33 is contained within the local terminal device 13.

FIG. 2 is an enlarged detail of the exhaust fan and associated controls. The remote logic module RLM 18 processes data as described above. The RLM 18 also has the external alarm light 29 which is actuated simultaneous when the alarm output to the local terminal device 13 and the remote maintenance location 41 occurs.

Sensing of fan shaft speed is accomplished by the motion detector 16 observing a target on the exhaust fan shaft 38. Upon a speed adjust output from the RLM 18, the motor speed controller 27 causes the motor 28 to increase (or decrease) speed or stop. The motion detecting device 16 continually sends pulses back to the RLM 18 which is the measurement of the speed of the fan shaft 38.

A redundant alarm pick-up to verify air flow by sensing velocity pressure is facilitated through the velocity probe 17. An adjustable differential pressure sensing switch 25 converts the pressure output of the velocity probe 17 to an electrical output which is carried back to the RLM 18 through low voltage cable 20, and also results in an alarm, if low velocity is indicated.

Figure 4:
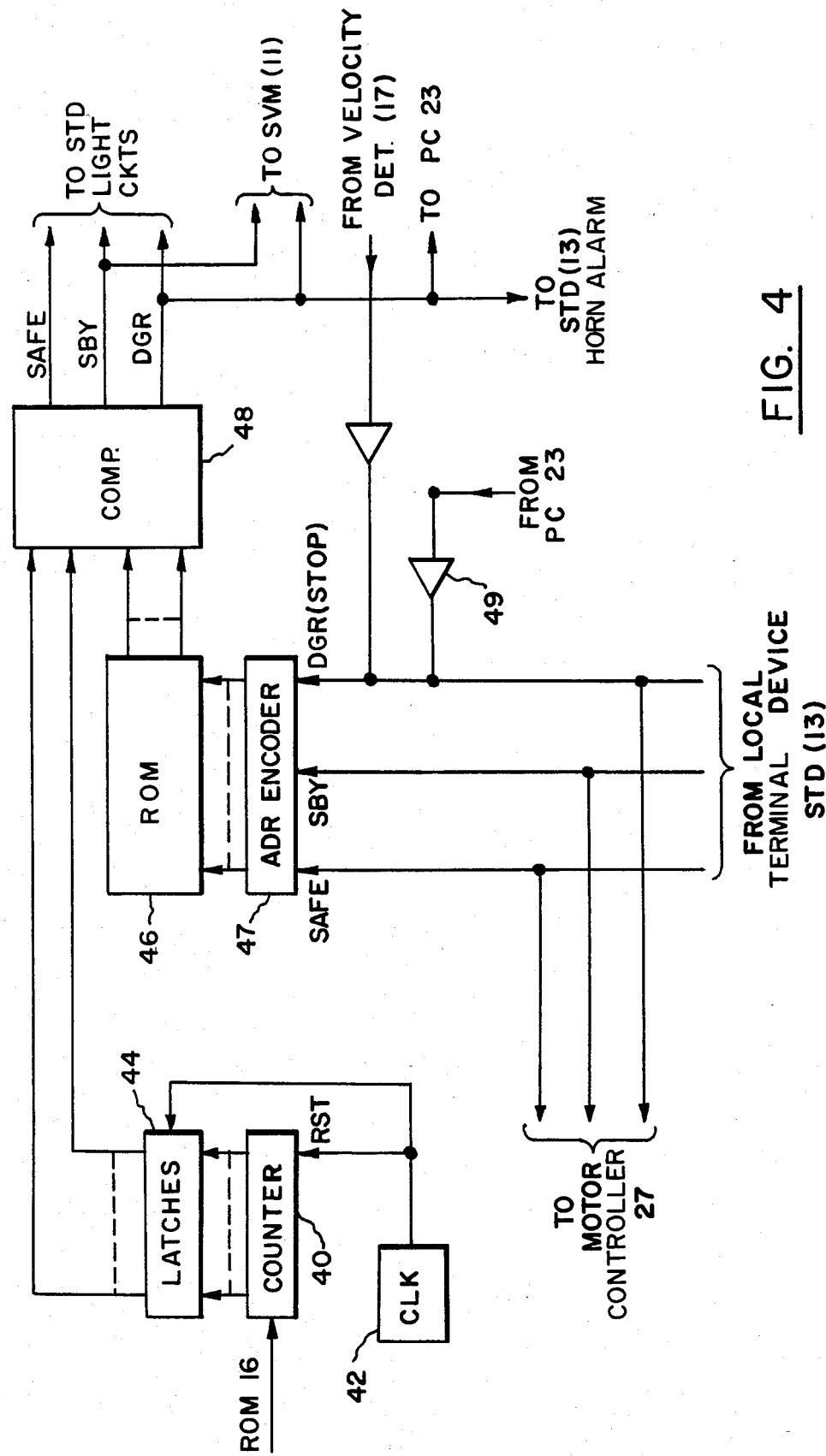
FIG. 4 is a block diagram of the remote logic module (RLM).

Referring to FIG. 4, there is shown an illustrative implementation of a typical RLM 18. The motor speed pulses from the detection device 16 are counted in a counter 40. A clock 42 transfers the speed count to latches 44 and resets the counter 40 once a minute. Codes for the "safe", "standby", and "off" for stop or danger speeds are stored in an ROM 46 (read only memory). These codes are selectively read out of the ROM 46 into a comparator 48 when the ROM is addressed via an address encoder 47 by levels from the local terminal device 13, which may be switch closures to ground or to an operating voltage source. These levels also go to the motor controller 27 which may be a conventional device (relay controlled) for changing the speed of the exhaust fan motor 28 or stopping it. The count code from the latches also goes to the comparator 48. The comparator generates "safe" and "standby" levels to operate the green or amber lights 31 and 32 (FIG. 3). An "off" (danger) level is generated when the input to the ROM 46 address encoder 47 is on the DGR input or when the count code and ROM 46 stored codes do not compare within a tolerance range (e.g. 10 RPM). The DGR input is also generated by the programmable controller (PC) 23 and is applied to the DGR input via an isolating amplifier 49. The effective DGR input from the PC 23 also goes to the alarm horn in the device (STD) 13.

A low velocity output from the detector 17 enables an alarm condition just like any other DGR input. Also standby and DGR outputs from the comparator 48 go to the supply volume control 11 and close the supply damper 10 to restrict room make-up air flow to accommodate reduced fume exhaust flow.

It will be seen that the fume hood ventilating system provided according to the herein illustrated embodiment of the invention uses a multiple of fume exhaust hoods, fans and motors, room air supplies, and the central building make-up air system and is rendered safer and more energy effective by:

1. Provision of local control of the hood exhaust volume through fan shaft speed control of the exhaust fan. This allows the fume hood to perform at full operating volume as required with the ability to reduce volume at any time for energy savings.

2. Automatic adjustment of room supply air to balance the selected exhaust rate to prevent harmful drafts and building cross-flow.

3. Provision of total building exhaust operating status to allow the make-up air system to be dynamically and accurately adjusted for energy savings.

4. Complete hood operating status through dynamic visual and audio indication at the fume hood, thus improving the safety integrity of the fume hood.

5. Local and remote alarm indication of an abnormal system function thus improving the safety integrity of the fume hood and simplifying maintenance.

6. Direct digital fan speed indication at the exhaust fan to simplify air balance and exhaust fan maintenance.

7. Diagnostic control system maintenance which may be readily implemented through a plug-in troubleshooter (not shown) to simplify maintenance of the control system itself. The logic levels in the RLM are detected to show properlogic levels for diagnostics.

8. An overall improvement in the integrity of the fume hood ventilating control by removing the need for moving parts in the corrosive environment of the exhaust air stream.

Variations and modifications of the herein described system, within the scope of the invention, will undoubtedly suggest themselves to those skilled in the art. Accordingly the foregoing description should be taken as illustrative and not in a limiting sense.

I claim:

1. A ventilation control system for a room equipped with a fume hood which enables the exhaust air flow through said hood to be reduced with safety which comprises a motor operated exhaust fan associated with said hood, means for circulating ventilating air through said room, means for selecting different speeds, including stop, of said exhaust fan, means for indicating with human recognizable indication the air flow through said hood produced by said exhaust fan, means responsive to the speed of rotation of said fan and said selecting means for operating said indicating means, said speed responsive means comprising means for detecting the rotations of a shaft drivingly connecting said motor and said exhaust fan, means for providing a control signal representing the rate of said rotations, said selecting means comprising switch means for selecting stop, faster and slow exhaust fan speeds, and said means responsive to the speed of rotation and said selecting means comprising programmable means for providing a plurality of outputs corresponding respectively to said stop, faster and slower speeds, and means for operating said indicating means in response to said outputs and to the rate of shaft rotations signal for indicating a danger condition when stop is selected and when faster and slower speeds are not achieved.

2. The system according to claim 1 wherein said selecting means and indicating means is an integral local terminal device in said room, said device having an array of lights and an array of manually actuable switches in proximity with each other.

3. The system according to claim 1 wherein said means responsive to the speed of operation of said fan and said selecting means further comprises a counter for counting said rate of rotation control signals and providing digital signals corresponding thereto, a logic module having means for storing a plurality of digital codes and also having means operated by said selecting means for causing said codes selectively to be compared with said digital signals for providing said plurality of outputs.

4. The system according to claim 3 wherein said circulating means comprises means for controlling the supply of air from the ventilating system of the building containing said room into said room, and means also operated by said exhaust fan and motor controlling means for operating said air supply controlling means to vary the supply of air into said room directly with the speed of said motor.

5. The system according to claim 4 wherein said building ventilation system includes a programmable controller for controlling the supply, exhaust and mixing of inside and outside air for said building, said programmable controller also being connected to said exhaust fan controlling means for also selecting said different motor speeds and for receiving at least one of said plurality of outputs which indicates that said faster and slower speeds are not achieved.

6. The system according to claim 5 wherein said indicating means has audible alarm means associated therewith, and means included in said speed control means for operating said audible alarm means when said stop condition is selected by the programmable controller and when at least one of said plurality of outputs occurs which indicates that said faster and slower speeds are not achieved.

7. The system according to claim 1 further comprising means for sensing the pressure due to the velocity of air flow caused by said exhaust fan and providing an output indicating the substantial absence of air flow, and means for providing said air flow absence output redundantly with any one of said plurality of outputs of said exhaust fan motor controlling means which indicates a danger condition.

* * * * *